(12) United States Patent
Deljavan Farshi et al.

(10) Patent No.: US 12,039,379 B2
(45) Date of Patent: *Jul. 16, 2024

(54) SYSTEM AND METHOD FOR EXECUTING A NOTIFICATION SERVICE

(71) Applicant: The Toronto-Dominion Bank, Toronto (CA)

(72) Inventors: Arash Deljavan Farshi, Richmond Hill (CA); Ivan Attard, Toronto (CA); Preetkanwal Samra, Brampton (CA); Adel Iles, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/821,961

(22) Filed: Aug. 24, 2022

(65) Prior Publication Data

US 2022/0413948 A1     Dec. 29, 2022

Related U.S. Application Data

(63) Continuation of application No. 17/302,799, filed on May 12, 2021, now Pat. No. 11,455,200, which is a
(Continued)

(51) Int. Cl.
*G06F 9/54* (2006.01)
*G06F 11/30* (2006.01)

(52) U.S. Cl.
CPC ............ *G06F 9/542* (2013.01); *G06F 11/302* (2013.01); *G06F 11/3055* (2013.01); *G06F 2201/86* (2013.01)

(58) Field of Classification Search
None
See application file for complete search history.

(56) References Cited

U.S. PATENT DOCUMENTS 6,910,070 B1     6/2005  Mishra et al.
8,621,072 B2    12/2013  Howard et al.
(Continued)

OTHER PUBLICATIONS

U.S. Appl. No. 17/302,799, filed May 12, 2021.
U.S. Appl. No. 17/248,693, filed Feb. 3, 2021.

*Primary Examiner* — Charles E Anya
(74) *Attorney, Agent, or Firm* — CPST Intellectual Property Inc.; Brett J. Slaney

(57) ABSTRACT

A system and method are provided for executing a notification service. The method includes accessing event data, obtained from a repository that is updated asynchronously by an event monitoring layer, to track the event data using the notification service separate from the event monitoring layer, and to determine when to trigger notifications, wherein the event data is associated with one or more events, each event being associated with at least one process workflow, and each event being at least in part associated with a sequence in the respective at least one process workflow; detecting, from the event data, an actionable item requiring a notification based on a current progress of a first one of the at least one process workflow being tracked; determining at least one parameter for the notification, wherein the notification is associated with a subsequent action of the first one of the at least one process workflow, determined based on at least one of the event data and the actionable item; and sending the notification to at least one client device user according to the at least one parameter.

18 Claims, 12 Drawing Sheets

Related U.S. Application Data continuation-in-part of application No. 17/248,693, filed on Feb. 3, 2021, now Pat. No. 11,461,153.

(56) References Cited

U.S. PATENT DOCUMENTS

| | | | |
|---|---|---|---|
| 8,825,798 B1 | 8/2014 | Johnson | |
| 9,934,027 B2 | 4/2018 | Shine et al. | |
| 10,503,568 B2 | 12/2019 | Chandrasekaran | |
| 10,657,537 B2 | 5/2020 | Revelle et al. | |
| 2002/0026433 A1 | 2/2002 | Kuiper | |
| 2002/0123966 A1 | 9/2002 | Chu et al. | |
| 2003/0088433 A1* | 5/2003 | Young | G06Q 30/0252 705/14.5 |
| 2003/0126181 A1* | 7/2003 | Young | G06Q 10/10 718/100 |
| 2005/0256732 A1 | 11/2005 | Bauer | |
| 2007/0156656 A1 | 7/2007 | Pather | |
| 2007/0208587 A1 | 9/2007 | Sitaraman | |
| 2008/0183744 A1 | 7/2008 | Adendorff | |
| 2010/0070479 A1* | 3/2010 | Maitino | G06Q 40/00 707/E17.014 |
| 2012/0239541 A1* | 9/2012 | Tsukahara | G06Q 40/02 705/35 |
| 2013/0166963 A1* | 6/2013 | Stoyanov | G06F 11/0784 714/48 |
| 2014/0108251 A1* | 4/2014 | Anderson | G06Q 20/4016 705/44 |
| 2015/0006235 A1 | 1/2015 | Jandhyala | |
| 2015/0074045 A1 | 3/2015 | Belfils | |
| 2015/0142501 A1 | 5/2015 | Nair | |
| 2015/0302303 A1* | 10/2015 | Hakim | G06Q 10/063 706/11 |
| 2015/0379469 A1 | 12/2015 | Gordon | |
| 2016/0164893 A1 | 6/2016 | Levi | |
| 2016/0239531 A1 | 8/2016 | P | |
| 2017/0083929 A1* | 3/2017 | Bates | G06F 16/951 |
| 2017/0154083 A1 | 6/2017 | Sunaram | |
| 2018/0270317 A1 | 9/2018 | Feng | |
| 2018/0287969 A1 | 10/2018 | Braodhurst | |
| 2019/0102411 A1 | 4/2019 | Hung et al. | |
| 2019/0363986 A1 | 11/2019 | Bhattacharjee | |
| 2020/0028701 A1 | 1/2020 | Liu | |

* cited by examiner

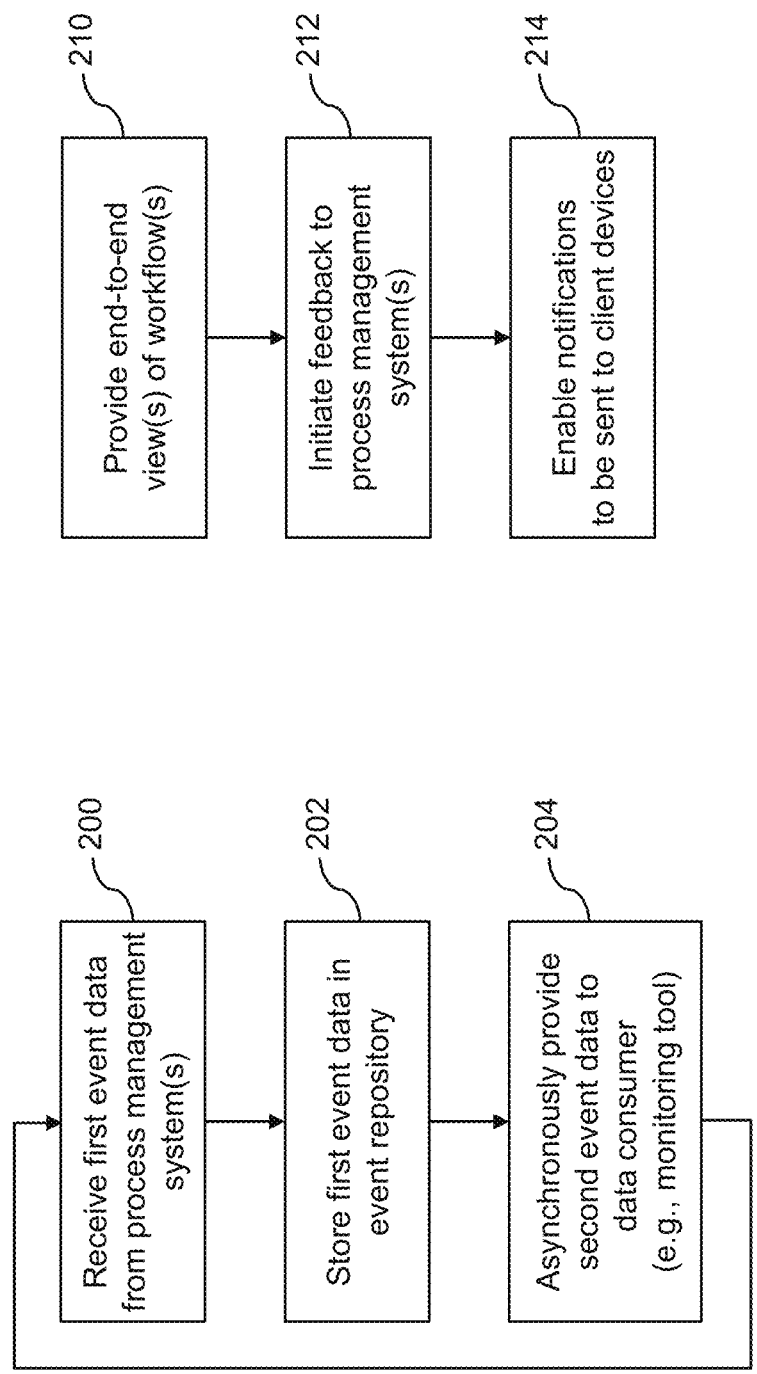

SYSTEM AND METHOD FOR EXECUTING A NOTIFICATION SERVICE

CROSS-REFERENCE TO RELATED APPLICATION

This application is a continuation of U.S. patent application Ser. No. 17/302,799 filed May 12, 2021 (issued as U.S. Pat. No. 11,455,200, on Sep. 27, 2022), which is a continuation-in-part of U.S. patent application Ser. No. 17/248,693 filed on Feb. 3, 2021 (issued as U.S. Pat. No. 11,461,153, on Oct. 4, 2022), the contents of which are incorporated herein by reference in their entirety.

TECHNICAL FIELD

The following relates generally to executing a notification service.

BACKGROUND

Process management systems can be used to manage process workflows that implement tasks according to a set of rules. For example, a business process such as onboarding a new client to an application or service may have an associated process management system that implements corresponding business process rules for that particular application or service.

Process management can become complex when multiple process management systems are operating together with various workflows, requests, actions, communications, and approvals working in tandem. For example, onboarding a new client or customer to multiple related or interconnected applications may involve several concurrent workflows and requests that can be difficult to manage when only being able to access or visualize the systems individually.

Additionally, processes within an enterprise, such as onboarding and providing ongoing services often require communications with customers or users. For example, during onboarding a customer may need to provide certain documentation or information and multi-stage processes can require reminders and status emails, among other things.

The volume and range of notifications can make managing such notifications onerous and is often done on a service or agent basis to avoid the need to keep track of when to send a notification, how long, and under what circumstances.

BRIEF DESCRIPTION OF THE DRAWINGS

Embodiments will now be described with reference to the appended drawings wherein:

FIG. 10 is a flow diagram of an example of computer executable instructions for monitoring events in process management systems.

FIG. 11 is a flow diagram of an example of computer executable instructions for interacting with a process management system based on event monitoring.

DETAILED DESCRIPTION

Figure 1:
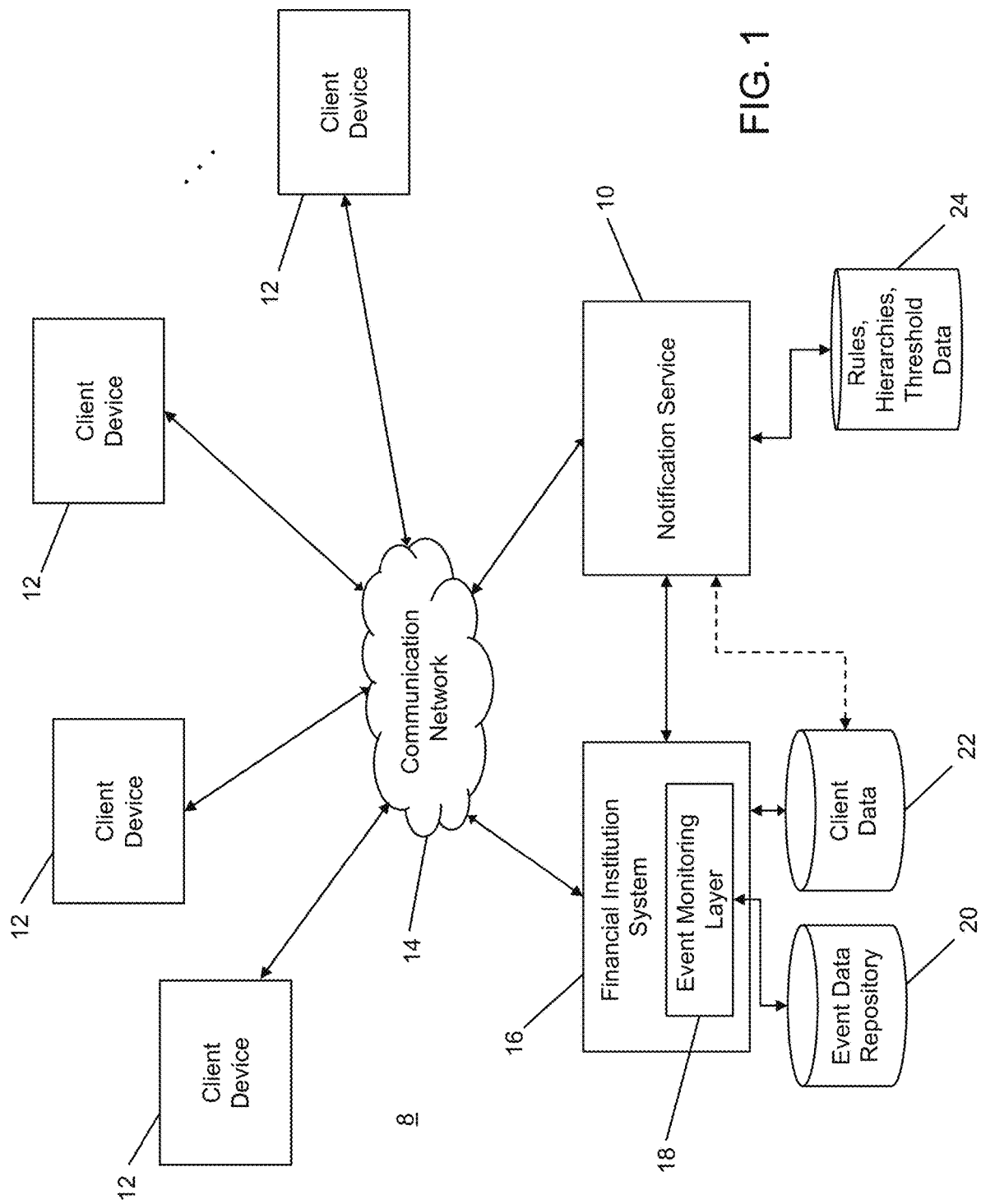
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

A central notification service is provided that is extendible, scalable, and updatable to account for the large number of rules, hierarchies and thresholds related to detecting and sending notifications to both customers and employees. The notification service has access to an event monitoring layer that continuously receives and buffers events and messages throughout an organization so that events can be identified, and corresponding notifications generated based on a central repository of rules, thresholds and knowledge of hierarchies associated with such notifications.

To monitor and manage workflows and processes implemented by one or more process management systems, the event monitoring layer (also referred to herein as an event monitoring system) asynchronously obtains and stores event data (e.g., messages) generated by the one or more process management systems such that the event data can be asynchronously consumed by a monitoring tool to both provide visualizations of an end-to-end view of workflows from a client or employee perspective, but also to provide feedback to a process management system (e.g., to update and/or move a process flow) and notifications to users such as clients and employees.

In another aspect, the presently described system can make the event data available to an analytics engine to analyze the event data, workflows, and to determine issues or improve upon workflows through such analyses. The analytics engine can also be used or accessed by the notification service to leverage the analyses to determine when and under which parameters notifications should be sent.

It will be appreciated that while examples provided herein are directed to financial institution applications and services such as wealth onboarding, the principles discussed herein equally apply to other process management systems and process management workflows used by any organization or enterprise.

Certain example systems and methods described herein are able to detect events, generate notifications based on actionable items determined in the events, and send notifications to client devices. In one aspect, there is provided a server device for executing a notification service, the server device comprising: a processor; a communications module coupled to the processor; and a memory coupled to the processor, the memory storing computer executable instructions that when executed by the processor cause the server device to: access event data, obtained from a repository that is updated asynchronously by an event monitoring layer, to track the event data using the notification service separate from the event monitoring layer, and to determine when to trigger notifications, wherein the event data is associated with one or more events, each event being associated with at least one process workflow, and each event being at least in part associated with a sequence in the respective at least one process workflow; detect, from the event data, an actionable item requiring a notification based on a current progress of a first one of the at least one process workflow being tracked; determine at least one parameter for the notification, wherein the notification is associated with a subsequent action of the first one of the at least one process workflow, determined based on at least one of the event data and the actionable item; and send the notification to at least one client device user according to the at least one parameter.

In another aspect, there is provided a method of executing a notification service, the method executed by a server device and comprising: accessing event data, obtained from a repository that is updated asynchronously by an event monitoring layer, to track the event data using the notification service separate from the event monitoring layer, and to determine when to trigger notifications, wherein the event data is associated with one or more events, each event being associated with at least one process workflow, and each event being at least in part associated with a sequence in the respective at least one process workflow; detecting, from the event data, an actionable item requiring a notification based on a current progress of a first one of the at least one process workflow being tracked; determining at least one parameter for the notification, wherein the notification is associated with a subsequent action of the first one of the at least one process workflow, determined based on at least one of the event data and the actionable item; and sending the notification to at least one client device user according to the at least one parameter.

In another aspect, there is provided a non-transitory computer readable medium for executing a notification service, the computer readable medium comprising computer executable instructions for: accessing event data, obtained from a repository that is updated asynchronously by an event monitoring layer, to track the event data using the notification service separate from the event monitoring layer, and to determine when to trigger notifications, wherein the event data is associated with one or more events, each event being associated with at least one process workflow, and each event being at least in part associated with a sequence in the respective at least one process workflow; detecting, from the event data, an actionable item requiring a notification based on a current progress of a first one of the at least one process workflow being tracked; determining at least one parameter for the notification, wherein the notification is associated with a subsequent action of the first one of the at least one process workflow, determined based on at least one of the event data and the actionable item; and sending the notification to at least one client device user according to the at least one parameter.

In certain example embodiments, new events added to the first repository can be compared to information in the second repository on a periodic basis to continuously trigger notifications.

In certain example embodiments, the second repository can be asynchronously updated on an ongoing basis as changes are made within the enterprise, the changes being pushed to the notification service executed by the server device to update the second repository.

In certain example embodiments, the at least one parameter for the notification specifies at least one recipient of the notification.

In certain example embodiments, the at least one parameter for the notification specifies a time when to send the notification.

In certain example embodiments, the at least one parameter for the notification specifies content to be included in the notification.

In certain example embodiments, the notification is associated with a next action in a process workflow determined from the second repository.

In certain example embodiments, the notification comprises an escalation message to be sent according to a hierarchy in a team of individuals.

In certain example embodiments, the device can connect, via the communications module, with a plurality of communication channels; and send the notification using a communication channel dictated by the at least one parameter. The notification can be sent to a plurality of client devices. The notification can also be sent to the plurality of client devices using at least two different communication channels.

FIG. 1 illustrates an exemplary computing environment 8. In one aspect, the computing environment 8 may include a notification service 10, an event monitoring layer 18, one or more client devices 12, and a communications network 14 connecting one or more components of the computing environment 8.

The computing environment 8 may also include a financial institution system 16 (e.g., for a commercial bank) that provides financial services accounts to users and processes financial transactions associated with those financial service accounts. In this example, the financial institution system 16 includes or otherwise provides the event monitoring layer 18 for illustrative purposes. It can be appreciated that the event monitoring layer 18 can also be implemented separately. While several details of the financial institution system 16 have been omitted for clarity of illustration, reference will be made to FIG. 5 below for additional details. The computing environment 8 may also include one or more process management systems 86 (see FIG. 4—described in greater detail below) that can include or otherwise represent components, services and features associated with the one or more process management systems 86, e.g., one or more business process management systems 86 associated with the financial institution system 16.

The event monitoring layer 18 and/or the financial institution system 16 includes or otherwise has access to a datastore for storing event data in an event data repository 20. The financial institution system 16 also includes or otherwise has access to a datastore for storing client data 22 such as user profile data, financial/transaction data, etc. The notification service includes or otherwise has access to a datastore for storing rules, hierarchies and threshold data 24. The data 24 can include any setting, parameter, characteristic, value, data point, indicator, content, rule, tag, flag, threshold or other data structure that can be used to detect an actionable item in the event data 20 that is continuously gathered and stored by the event monitoring layer 18. That is, the rules, hierarchies and threshold data 24 can include rules, hierarchical data, and thresholds, but is not limited to only such data.

While not shown in FIG. 1, the event monitoring layer 18 may store workflow data, which can include any information or content, such as documents, forms, metadata, electronic messages, alerts, statuses, events, notifications, profile data, etc. that have been associated with one or more process workflows. As such, the workflow data can be mapped to the event data repository 20 and/or the client data 22 or be included in one of these datastores.

The client data 22 can include data associated with a user such as client profile data that may be mapped to corresponding financial data for that user and/or may include some of the financial data. It can be appreciated that such financial data could also include transaction data. Moreover, the datastores in FIG. 1 are shown separately for illustrative purposes and, when controlled by the same enterprise (e.g., financial institution system 16) can be combined into a single datastore, database, or other memory. The client data 22 can include both data that is associated with a client (e.g., profile data) as well as data that is associated with one or more user accounts for that client as recognized by the computing environment 8.

The data associated with a client may include, without limitation, demographic data (e.g., age, gender, income, location, etc.), preference data input by the client, and inferred data generated through machine learning, modeling, pattern matching, or other automated techniques. The client data 22 may also include historical interactions and transactions associated with the financial institution system 16 and/or notification service 10 and/or process management systems 86, e.g., login history, search history, communication logs, documents, etc.

Figure 4:
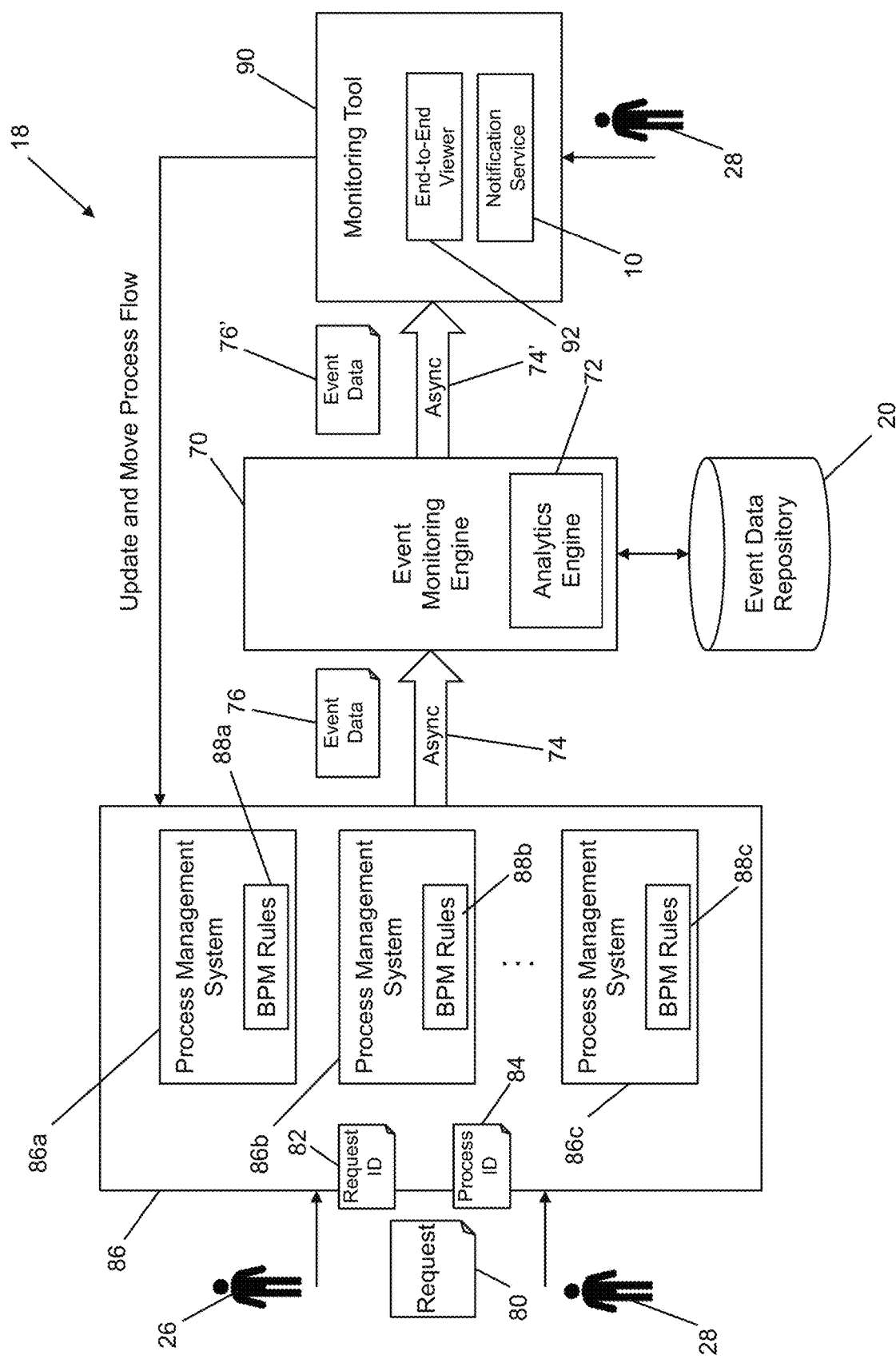
FIG. 4 is a schematic diagram of the example computing environment showing further detail of an event monitoring system coupled to a unified process management system environment.

It can also be appreciated that the process management system(s) 86 shown in FIG. 4, and financial institution system 16, can be separate systems or can be part of the same system. For example, the process management system(s) 86 can be part of the financial institution system 16 and its various applications, services and processes that are implemented with and on behalf of clients/users/customers.

Client devices 12 may be associated with one or more users. Users may be referred to herein as customers, clients, correspondents, or other entities that interact with the financial institution system 16 and/or notification service 10 (directly or indirectly). The client devices 12 shown in FIG. 1 also represent users associated with employees or other administrators or members of the financial institution system 16 or other enterprise in which the event monitoring layer 18 and notification service 10 are integrated. The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, a customer may use client device 12 to engage and interface with a mobile or web-based banking application which uses or incorporates one or more process management systems 86 and the notification service 10 to perform services or provide applications or functionality to that customer. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, notification service 10, event monitoring layer 18 and process management system(s) 86 may be implemented using one or more computer systems configured to process and store information and execute software instructions to perform one or more processes consistent with the disclosed embodiments. In certain embodiments, although not required, notification service 10, event monitoring layer 18 and/or process management system(s) 86 may be associated with one or more business entities. In certain embodiments, notification service 10, event monitoring layer 18 and/or process management system(s) 86 may represent or be part of any type of business entity. For example, notification service 10, event monitoring layer 18 and/or process management system(s) 86 may be a system associated with a commercial bank (e.g., financial institution system 16), a retailer, or some other type of business. The notification service 10, event monitoring layer 18 and/or process management system(s) 86 can also operate as standalone entities that are configured to serve multiple business entities, e.g., to act as an agent therefor.

Referring back to FIG. 1, the notification service 10, the event monitoring layer 18, financial institution system 16 and/or process management system(s) 86 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the notification service 10, event monitoring layer 18, financial institution system 16, and process management system(s) 86. The cryptographic server may be used to protect the data 20, 22, 24 stored in the respective datastores by way of encryption for data protection, digital signatures or message digests for data integrity, and by using digital certificates to authenticate the identity of the users and client devices 12 with which the notification service 10, event monitoring system 18, the financial institution system 16, and the process management system(s) 86 communicate to inhibit data breaches by adversaries. It can be appreciated that various cryptographic mechanisms and protocols can be chosen and implemented to suit the constraints and requirements of the particular deployment of the notification service 10, the event monitoring layer 18, the financial institution system 16, and the process management system(s) 86 as is known in the art.

Figure 2:
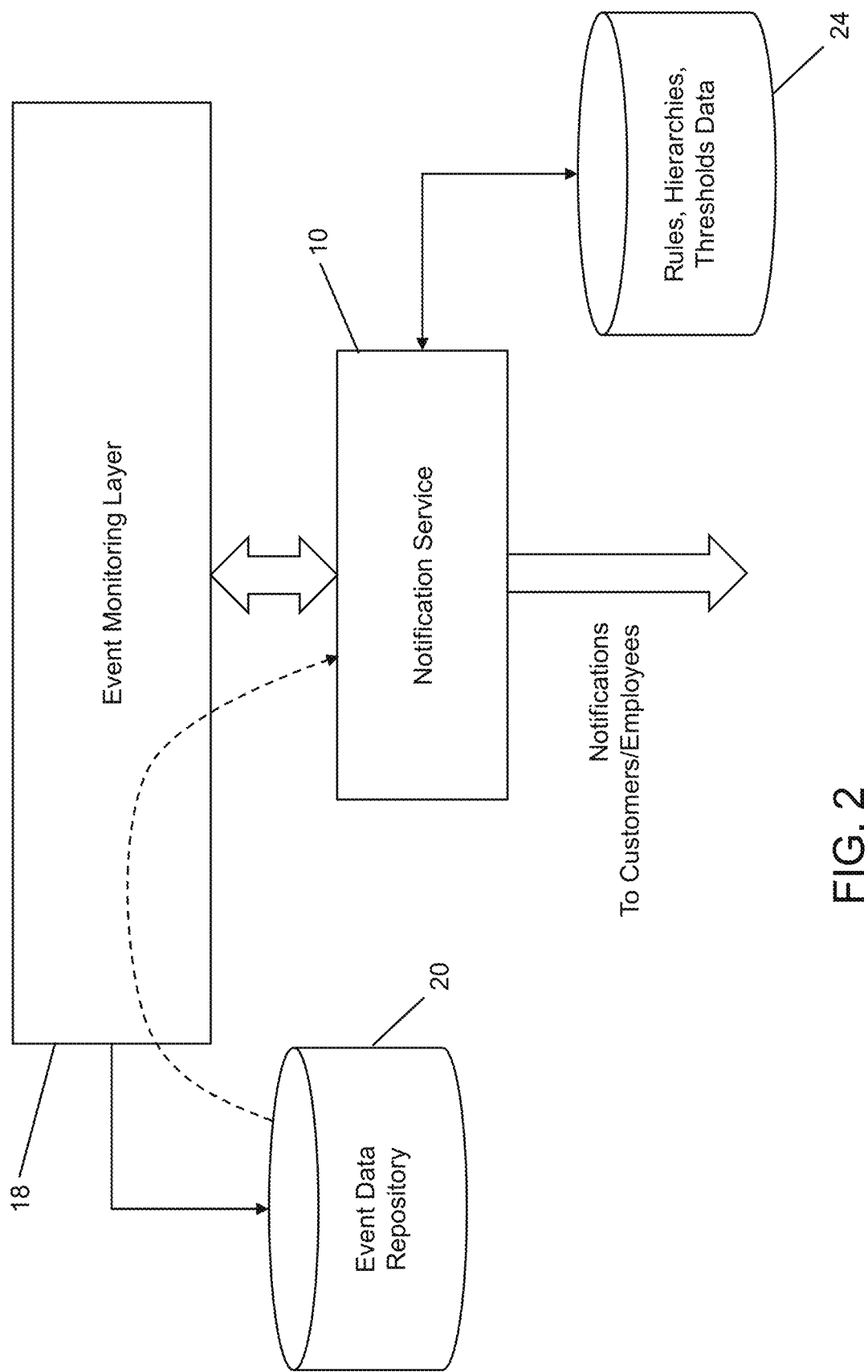
FIG. 2 is a schematic diagram of an example of a notification service integrated with an event monitoring layer.

Referring now to FIG. 2, an integration between the notification service 10 and the event monitoring layer 18 is shown. The notification service 10 can be configured to operate alongside or otherwise have access to the event monitoring layer 18 that itself is asynchronously connected to one or more individual departments, entities, or units within an organization such as the financial institution system 16. The events that are streamed to the event monitoring layer 18 are buffered for later consumption in the event data repository 20. By having access to these continuous streams of events (and data and information associated with the events), the notification service 10 can automate the logic for determining which events should trigger a notification, when that notification should be sent, to whom it should be sent, and on which communication platform to send the notification. The notification service 10 can also rely on knowledge of hierarchies and other rules (from the rules, hierarchies and thresholds data 24) surrounding escalation of notifications so that an escalation of a step in a process can be automatically initiated. Moreover, the timing of when notifications should be sent and on which communication platform or via which medium can be centrally controlled and updated by having access to the repository of rules, hierarchies and thresholds data 24. This repository of data 24 can be updated asynchronously by the enterprise (e.g., financial institution system 16) with the notification service 10 configured to evaluate and balance what is detected in the event data repository 20 and the repository of data 24 to take into account or react to the most up-to-date events and constraints imposed by the enterprise. In this way, the notification service 10 can be extended, scaled, or otherwise updated at any time while continuing to monitor the event data repository 20 that is itself being continually updated by the event monitoring layer 18.

Figure 3:
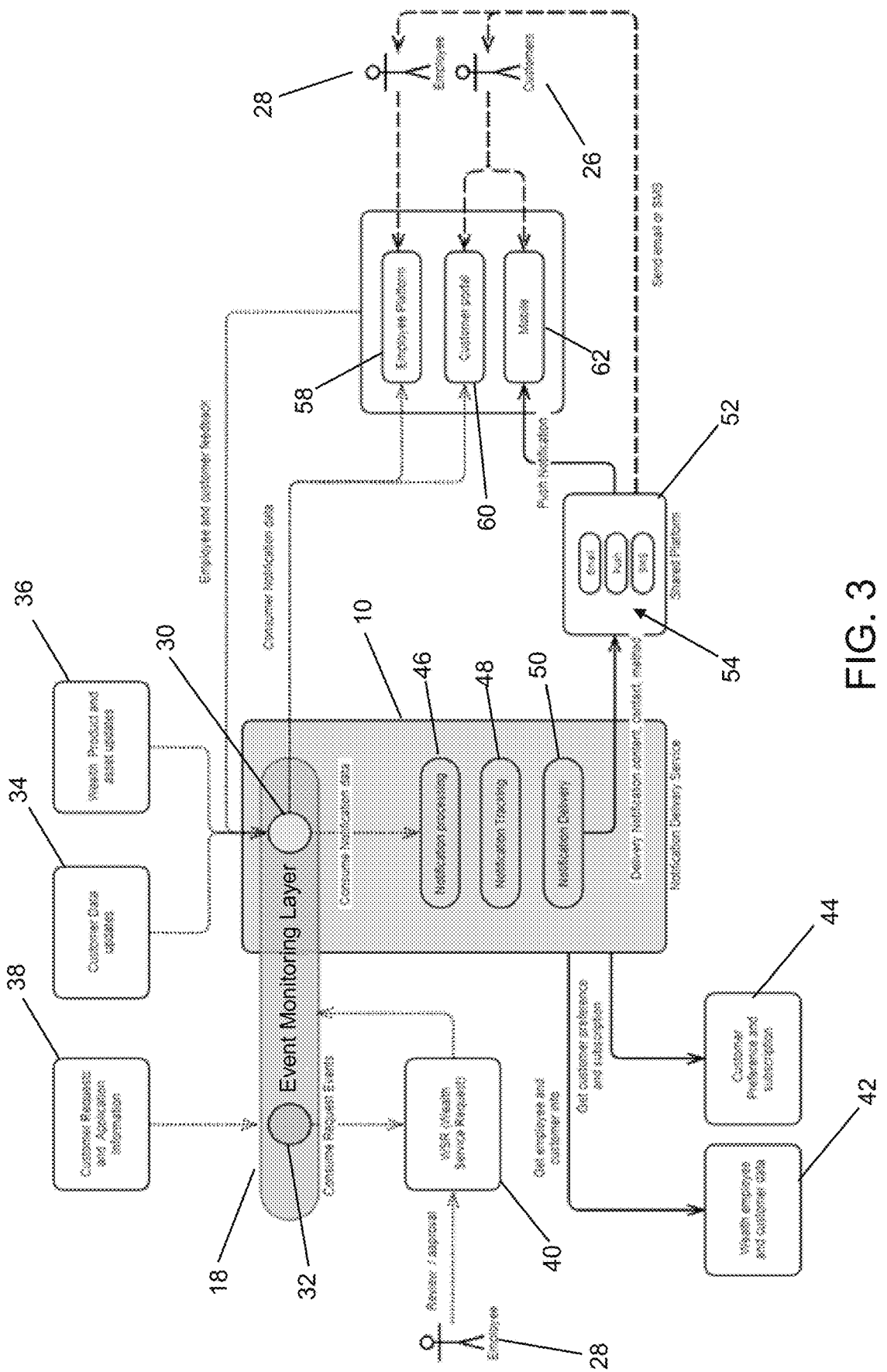
FIG. 3 is a schematic diagram of an example of an implementation for executing a notification service using the integration with the event monitoring layer.

FIG. 3 illustrates an example of an implementation for executing the notification service 10 with additional details for integrating the notification service 10 with the event monitoring layer 18. In this example, the notification service 10 interfaces with the event monitoring layer 18 via a data consumption node 30 that monitors, obtains, is provided with, or scrapes data that is persisted by the event monitoring layer 18 to consume notification data for a notification processing module 46.

The example shown in FIG. 3 illustrates a wealth management application and process workflow and it will be appreciated that the principles and configuration can apply to any process workflow and associated application. An employee 28 of an enterprise such as the financial institution system 16 can interact with a user interface for performing service requests at block 40, e.g., for reviews and approvals of an onboarding of a client, an account or product registration, etc. This feeds event data into the event monitoring layer 18 that consumes request events at a request event consumption node 32. The event monitoring layer 18 also enables customer requests at block 38, customer data updates at block 34, and product and asset updates at block 36 to create events consumed by the event monitoring layer 18. That is, the event monitoring layer 18 can be integrated with various aspects of process and application workflows to continuously and asynchronously detect, consume, and persist event data in the event data repository 20 (seen in FIGS. 2 and 4).

The notification service 10 can also access employee and customer data from block 42 and customer preference and subscription data at block 44. Such data at blocks 42, 44 can be part of the client data 22 or additional data. This enables the notification service 10 to determine certain parameters for notifications based on the type of client (employee, customer, etc.) as well as any saved preferences or subscriptions for notifications (e.g., alerts for price changes on a trade, updates to interest rates, etc.). The notification service 10 can therefore be provided with access to client data 22 and potentially other sources of data to determine parameters for a notification and apply those. This can be done asynchronously from consuming notification data at node 30. The notification service 10 includes a notification tracking module 48 to monitor and track data consumed by the notification service 10 from the event monitoring layer 18 to determine when to trigger a notification delivery module 50 to send a delivery notification to one or more communication channels 54 on a shared platform 52 in this example, that being shared with the financial institution system 16.

The notification tracking module 48 can use access to the rules, hierarchies and thresholds data 24 (see FIGS. 2 and 4) to determine actionable items in the event data that has been evaluated. For example, the notification tracking module 48 can look for certain triggers that an event in a process workflow such as an approval has been processed or is being held up so that an appropriate notification can be generated and sent. This can include evaluating a hierarchy to know when to escalate a notification to a supervisor or to escalate a technical issue or question to a different entity or department.

As shown in FIG. 3, notification data can be sent by the consumption node 30 (e.g., using the notification processing and tracking modules 46, 48) directly to an employee platform 58 and/or customer portal 60 such as a website. The platform 58 and portal 60 are provided for the employees 28 and customers 26 for interacting with the financial institution system 16 in this example. The platform 52 in this example provides push notifications to a mobile application 62 used by the customers 26. It can be appreciated that the notification delivery service 10 can be configured to consume event data and provide appropriate notifications according to data 24 using any available channel between the enterprise (financial institution system 16 in this example) and the client, user, customer, employee etc., e.g., via a client device 12.

The notification service 10 can be integrated with the event monitoring layer 18 in various example embodiments. In FIG. 4, an example configuration of the event monitoring layer 18 is shown. The event monitoring layer 18 includes an event monitoring engine 70 that is configured to decouple the one or more process management systems 86, which produce event data related to respective management workflows; from a monitoring tool 90 or other entity that consumes such event data. The one or more process management systems 86 in this example includes three separate process management systems 86a, 86b, 86c, each having its own business process management (BPM) rules 88a, 88b, 88c. It can be appreciated that any one or more process managements systems 88a can work with the event monitoring layer 18 and three is only illustrative. The process management systems 86 can be stand-alone and self-sufficient environments in which process workflows are implemented or can be interconnected with other process management systems 86, e.g., to implement an integrate workflow across multiple business units or sub-units within an enterprise or other organization. The BPM rules 88 can include any criteria or parameters or framework elements within which the workflow(s) being implemented by the corresponding process management system 86 are to follow or conform.

FIG. 4 illustrates two types of users, namely a customer user 26 and an employee user 28. It can be appreciated that the customer user 26 can represent any client or consumer that interacts with at least one of the process management systems 86*a*, 86*b*, 86*c*, whether or not that customer user 26 is associated with the financial institution system 16 (provided by way of illustration only). The users 26 can interact with a process management system 86*a*, 86*b*, 86*c* to engage in or contribute to a process workflow (e.g., onboarding, registering, applying, transferring, etc.) by making a request 80. Each request 80 can be assigned a unique request ID 82 to identify the events, users, and other data or information associated with the request 80 as the process workflow progresses. A process ID 84 can also be generated for the process(es) and/or subprocess(es) associated with the process workflow. These identifiers 82, 84 can be associated with event data 76 that is generated and made available to the event monitoring engine 70 via an asynchronous channel 74. The event data 76 may be generated periodically or continuously in real-time as process workflows progress (or do not progress). The event data 76 can include status updates, inactivity alerts, progress alerts, milestones, completion notices, commencement notices, or any other event-related notifications or information. The event monitoring engine 70 receives the event data 76 and persists the event data 76 in the event data repository 20 to be consumed by the notification service 10 as shown in FIGS. 2 and 3, as well as an analytics engine 72 for analyzing the event data 76 and to be consumed asynchronously from receiving the event data 76 by the monitoring tool 90. In this example a second asynchronous channel 74' is established between the event monitoring engine 70 and the monitoring tool 90 to provide snapshots of event data 76' pulled from the event data repository 20.

Since the event data 76 produced by the process management systems 86 is decoupled from the consumers of that data, the event data repository 20 can be continually updated while such snapshots providing a near real-time view of what is happing in the process workflows. In this way, employee users 28 can visualize the workflows in an end-to-end fashion across multiple consumer users 26 or across the various consumer users 26 handled by a particular employee user 28. The monitoring tool 90 in this example includes an end-to-end viewer 92, which can provide a graphical user interface to enable employee users 28 to view workflow progress and other data or metrics associated with the operations of the process management systems 86. The monitoring tool 90 also includes an application or application programming interface (API) interfaced into the notification service 10 to allow notifications, alerts, instructions, or other messages to be generated by an employee user 28 to communicate with the customers 26, other employees 28, or the process management systems 86 themselves, e.g., to update and move a process flow as shown in the feedback loop provided in FIG. 4.

Figure 5:
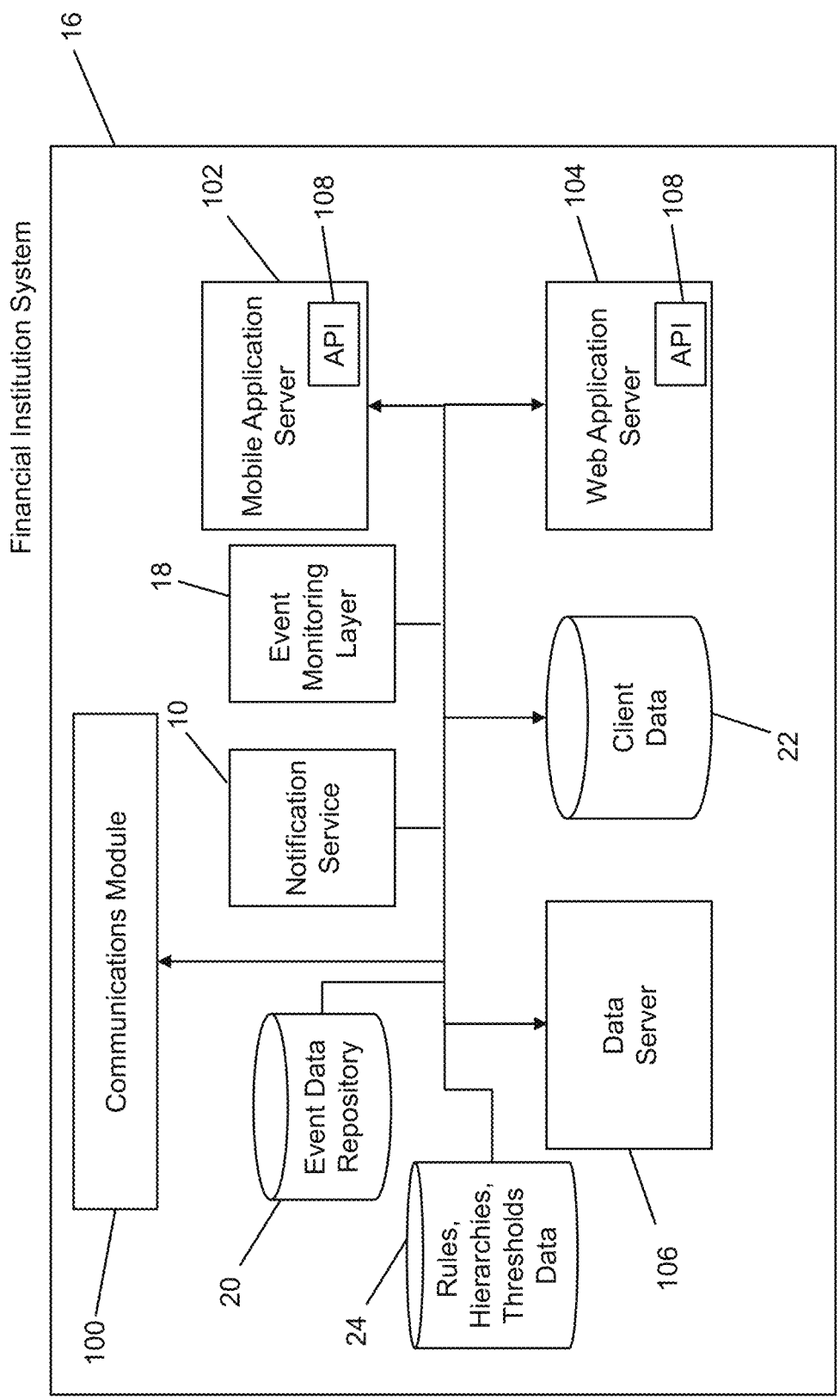
FIG. 5 is a block diagram of an example configuration of a financial institution system.

In FIG. 5, an example configuration of the financial institution system 16 is shown. The financial institution system 16 includes a communications module 100 that enables the financial institution system 16 to communicate with one or more other components of the computing environment 8, such as client device 12 (or one of its components) or the process management system(s) 86 (not shown in FIG. 5—see FIG. 4), via a bus or other communication network, such as the communication network 14. While not delineated in FIG. 5, the system 16 includes at least one memory or memory device that can include a tangible and non-transitory computer-readable medium having stored therein computer programs, sets of instructions, code, or data to be executed by one or more processors (not shown for clarity of illustration). FIG. 5 illustrates examples of servers and datastores/databases operable within the financial institution system 16. It can be appreciated that any of the components shown in FIG. 5 may also be hosted externally and be available to the system 16, e.g., via the communications module 100. In the example embodiment shown in Ha 5, the financial institution system 16 includes one or more servers to provide access to the client data 22 (which may include in financial data) to the event monitoring layer 18 and process management system(s) 86 to enable workflows to progress. The financial institution system 16 also includes one or more services to provide access to the rules, hierarchies, and thresholds data 24 for the notification service 10 as illustrated above.

Exemplary servers include a mobile application server 102, a web application server 104 and a data server 106. Although not shown in FIG. 5, as noted above, the financial institution system 16 may also include a cryptographic server for performing cryptographic operations and providing cryptographic services. The cryptographic server can also be configured to communicate and operate with a cryptographic infrastructure. The system 16 may also include one or more datastores for storing and providing data for use in such services, such as data storage for storing the client data 22 and event data 76 stored in the event data repository 20.

Mobile application server 102 supports interactions with a mobile application installed on client device 12. Mobile application server 102 can access other resources of the financial institution system 16 to carry out requests made by, and to provide content and data to, a mobile application on client device 12. In certain example embodiments, mobile application server 102 supports one or more mobile banking and/or investment applications to provide payments from one or more accounts of user, among other things.

Web application server 104 supports interactions using a website accessed by a web browser application 162 (see FIG. 8) running on the client device 12. It can be appreciated that the mobile application server 102 and the web application server 104 can provide different front ends for the same application, that is, the mobile (app) and web (browser) versions of the same application. For example, the financial institution system 16 may provide a banking application that be accessed via a smartphone or tablet app while also being accessible via a browser on any browser-enabled device.

The client data 22 may be associated with users of the client devices 12 (e.g., customers of the financial institution). The client data 22 may include financial data such as any data related to or derived from financial values or metrics associated with customers of the financial institution system 16, for example, account balances, transaction histories, line of credit available, credit scores, mortgage balances, affordability metrics, investment account balances, investment values and types, among many others. Other metrics can be associated with such financial data, such as financial health data that is indicative of the financial health of the users of the client devices 12. As indicated above, it can be appreciated that the client data 22 can also include user profile data and transaction data.

The event monitoring layer 18 and notification service 10 are examples of modules, functions, services, tools or options provided within the financial institution system 16 that may be used by one or more of the servers 102, 104, 106 to enable users and/or administrators to interact or integrate with the process management system(s) 86. For example, the event monitoring layer 18 and notification service 10 can be used by the financial institution system 16 to leverage event data 76 obtained by the event monitoring engine 70 and certain client data 22 to enhance the monitoring and implementation of workflows such as in an onboarding process and delivery appropriate notifications by referencing the rules, hierarchies, and thresholds data 24. The mobile application server 102 and web application server 104 can each include an API 108 to permit the notification service 10 and/or event monitoring layer 18 to be integrated into web and mobile applications and services.

Figure 6:
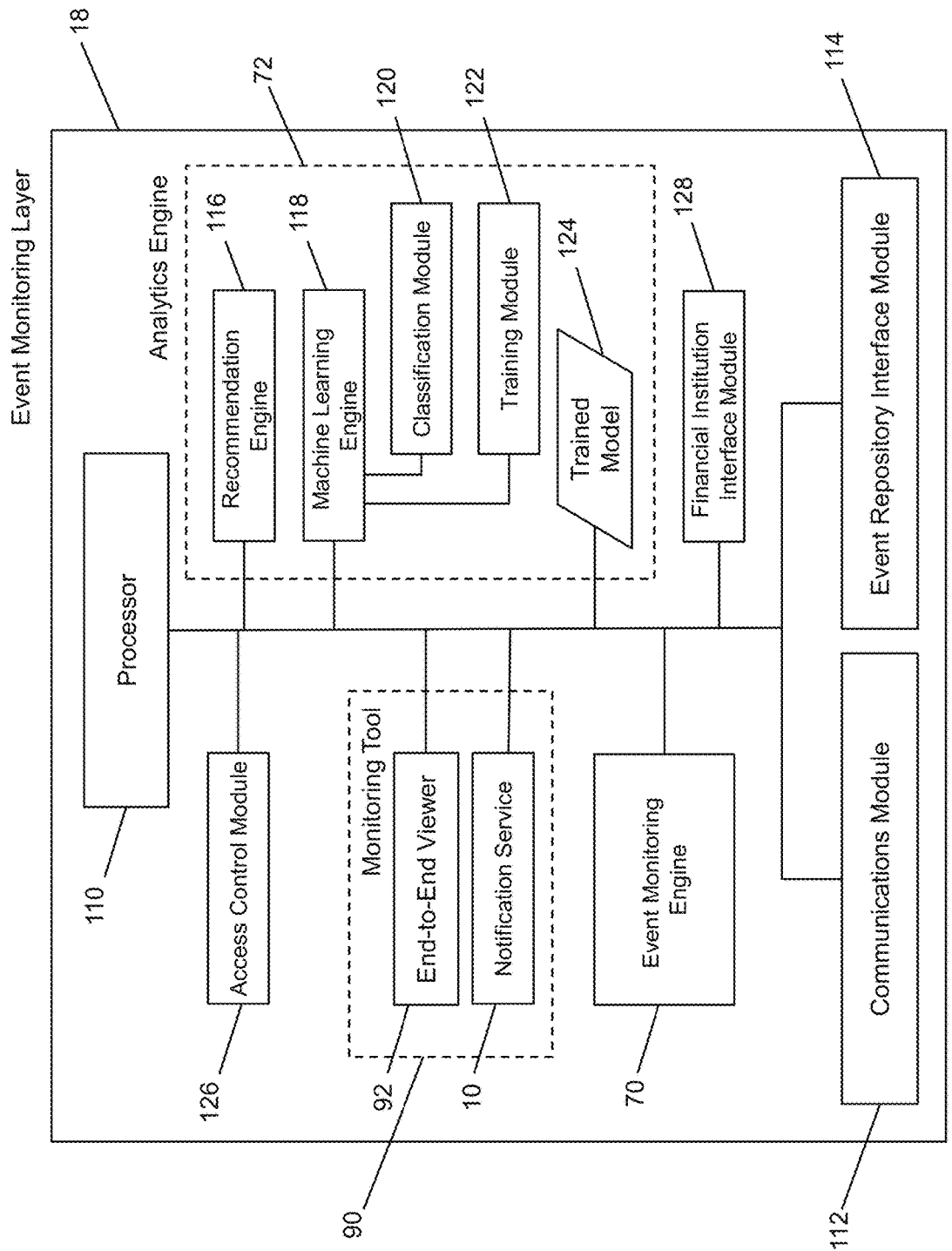
FIG. 6 is a block diagram of an example configuration of the event monitoring layer.

In FIG. 6, an example configuration of the event monitoring layer 18 is shown. In certain embodiments, the event monitoring layer 18 may include one or more processors 110, a communications module 112, and an event repository interface module 114 for interfacing with the event repository 18 to retrieve, modify, and store (e.g., add) data. Communications module 112 enables the event monitoring layer 18 to communicate with one or more other components of the computing environment 8, such as client device 12 (or one of its components), via a bus or other communication network, such as the communication network 14. While not delineated in FIG. 6, the event monitoring layer 18 includes at least one memory or memory device that can include a tangible and non-transitory computer-readable medium having stored therein computer programs, sets of instructions, code, or data to be executed by processor 110. FIG. 6 illustrates examples of modules, tools and engines stored in memory on the event monitoring layer 18 and operated by the processor 110. It can be appreciated that any of the modules, tools, and engines shown in FIG. 6 may also be hosted externally and be available to the event monitoring layer 18, e.g., via the communications module 112. In the example embodiment shown in FIG. 6, the event monitoring layer 18 includes the analytics engine 72, which includes a recommendation engine 116, a machine learning engine 118, a classification module 120, a training module 122, and a trained model 124. The event monitoring layer 18 also includes an access control module 126, an event monitoring module 128, and a financial institution interface module 128. The event monitoring layer 18 also includes the monitoring tool 90 that includes or otherwise provides functionality associated with the end-to-end viewer 92 and notification service 10 as described above.

The recommendation engine 116 is used by the analytics engine 72 of the event monitoring layer 18 to generate one or more recommendations for the event monitoring layer 18 and/or a client device 12 that is/are related to an association between event data 76 monitored by the layer 18 and the users or process workflows in which the users are engaged. For example, the analytics engine 72 can obtain a snapshot of event data 76' related to a particular user from the event repository 18 to determine how to improve the workflow(s) or to extract insights into how that user interacts with the financial institution system 16 and/or process management systems 86*a*, 86*b*, 86*c*. It may be noted that a recommendation as used herein may refer to a prediction, suggestion, inference, association or other recommended identifier that can be used to generate a suggestion, notification, command, instruction or other data that can be viewed, used or consumed by the event monitoring layer 18, the financial institution system 16 and/or the client devices 12. The recommendation engine 116 can access the data in the event data repository 20 and, if permitted, the client data 22 and/or workflow data stored by the event monitoring layer 18, via the event repository interface module 114 and/or communication module 112 and apply one or more inference processes to generate the recommendation(s). The recommendation engine 116 may utilize or otherwise interface with the machine learning engine 118 to both classify data currently being analyzed to generate a suggestion or recommendation, and to train classifiers using data that is continually being processed and accumulated by the event monitoring layer 18. That is, the recommendation engine 116 can learn event- or workflow-related preferences and revise and refine classifications, rules or other analytics-related parameters over time. For example, the analytics engine 72 can be used to update and refine the BPM rules 88 associated with a process management system 86 based on the learning or other analytics performed, e.g., based on recommendations to change or add rules.

The machine learning engine 118 may also perform operations that classify the event data in accordance with corresponding classifications parameters, e.g., based on an application of one or more machine learning algorithms to each of the groups of data 20, 22, 24 (also referred to herein as "user content", "event or workflow content", "user information" or "client information"). The machine learning algorithms may include, but are not limited to, a one-dimensional, convolutional neural network model (e.g., implemented using a corresponding neural network library, such as Keras®), and the one or more machine learning algorithms may be trained against, and adaptively improved, using elements of previously classified profile content identifying suitable matches between content identified and potential actions to be executed. Subsequent to classifying the event- or workflow-related content or content being analyzed, the recommendation engine 116 may further process each element of the content to identify, and extract, a value characterizing the corresponding one of the classification parameters, e.g., based on an application of one or more additional machine learning algorithms to each of the elements of the event- or workflow-related content. By way of example, the additional machine learning algorithms may include, but are not limited to, an adaptive natural language processing algorithm that, among other things, predicts starting and ending indices of a candidate parameter value within each element of the content, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified content. Classification parameters may be stored and maintained using the classification module 120, and training data may be stored and maintained using the training module 122.

The trained model 124 may also be created, stored, refined, updated, re-trained, and referenced by the notification service 10, event monitoring layer 18 and/or financial institution system 16 (e.g., by way of the analytics engine 72) to determine associations between users, events, workflow or content related thereto. Such associations can be used to generate recommendations or suggestions for improving or streamlining workflows or to identify efficiencies that could be injected into such workflows based on other available user information.

In some instances, classification data stored in the classification module 120 may identify one or more parameters, e.g., "classification" parameters, that facilitate a classification of corresponding elements or groups of recognized content based on any of the exemplary machine learning algorithms or processes described herein. The one or more classification parameters may correspond to parameters that can indicate an affinity or compatibility between the data 20, 22, 24, and certain potential actions. For example, a bottleneck at a certain point in a workflow seen across multiple user experiences can be used to generate a recommendation or action related to alleviating that bottleneck, e.g., by redirecting resources within an enterprise.

In some instances, the additional, or alternate, machine learning algorithms may include one or more adaptive, natural-language processing algorithms capable of parsing each of the classified portions of the content and predicting a starting and ending index of the candidate parameter value within each of the classified portions. Examples of the adaptive, natural-language processing algorithms include, but are not limited to, natural-language processing models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between an element of event data (e.g., a value or type of data being augmented with an event or workflow) and a single classification parameter and additionally, or alternatively, multiple classification parameters.

Based on the output of the one or more machine learning algorithms or processes, such as the one-dimensional, convolutional neural network model described herein, machine learning engine 118 may perform operations that classify each of the discrete elements of event- or workflow-related content as a corresponding one of the classification parameters, e.g., as obtained from classification data stored by the classification module 120.

The outputs of the machine learning algorithms or processes may then be used by the recommendation engine 116 to generate one or more suggested recommendations, notifications, rules, instructions or other instructional or observational elements that can be presented to the user (e.g., client or employee).

Referring again to FIG. 6, the access control module 126 may be used to apply a hierarchy of permission levels or otherwise apply predetermined criteria to determine what event repository data 18, client or workflow data in the datastores 20, 22, 24 or other financial or transactional data can be shared with which entity in the computing environment 8. For example, the event monitoring layer 18 may have been granted access to certain sensitive transaction data or financial data for a user, which is associated with a certain client device 12 in the computing environment 8. Similarly, certain client data 22 may include potentially sensitive information such as age, date of birth, or nationality, which may not necessarily be needed by the event monitoring layer 18 to execute certain actions. As such, the access control module 126 can be used to control the sharing of certain client data 22, workflow data, or event data stored in the event data repository 20 based on a type of client/user/customer/employee, a permission or preference, or any other restriction imposed by the computing environment 8 or application in which the event monitoring layer 18 is used.

The event monitoring layer 18 in this example also includes the monitoring tool 90 described above, which provides the end-to-end viewer 92 and a module, application or API into the notification service 10, to enable an employee to interface and interact with the event monitoring layer 18 to asynchronously consume the event data in the event repository 18 and to use the analytics system 72 for additional functionality and insights.

The event monitoring engine 70 is also shown in FIG. 6 which, as described above, asynchronously saves, stores, and retrieves event data 76, 76' to/from the event data repository 20 as herein described. As illustrated in FIG. 6, the event monitoring engine 70 can be considered a device having a processor 110, memory and a communications module 112 configured to work with or as part of the event monitoring engine 70 to perform the operations described herein. It can be appreciated that the various elements of the event monitoring layer 18 are shown delineated as such in FIG. 6 for illustrative purposes and clarity of description and could be provided using other configurations and distribution of functionality and responsibilities.

The event monitoring layer 18 may also include a financial institution interface module 128 to provide a graphical user interface (GUI) or API connectivity to communicate with the financial institution system 16 to obtain client data 22 and workflow data for a certain user/users or workflow. It can be appreciated that the financial institution interface module 128 may also provide a web browser-based interface, an application or "app" interface, a machine language interface, etc.

Figure 7:
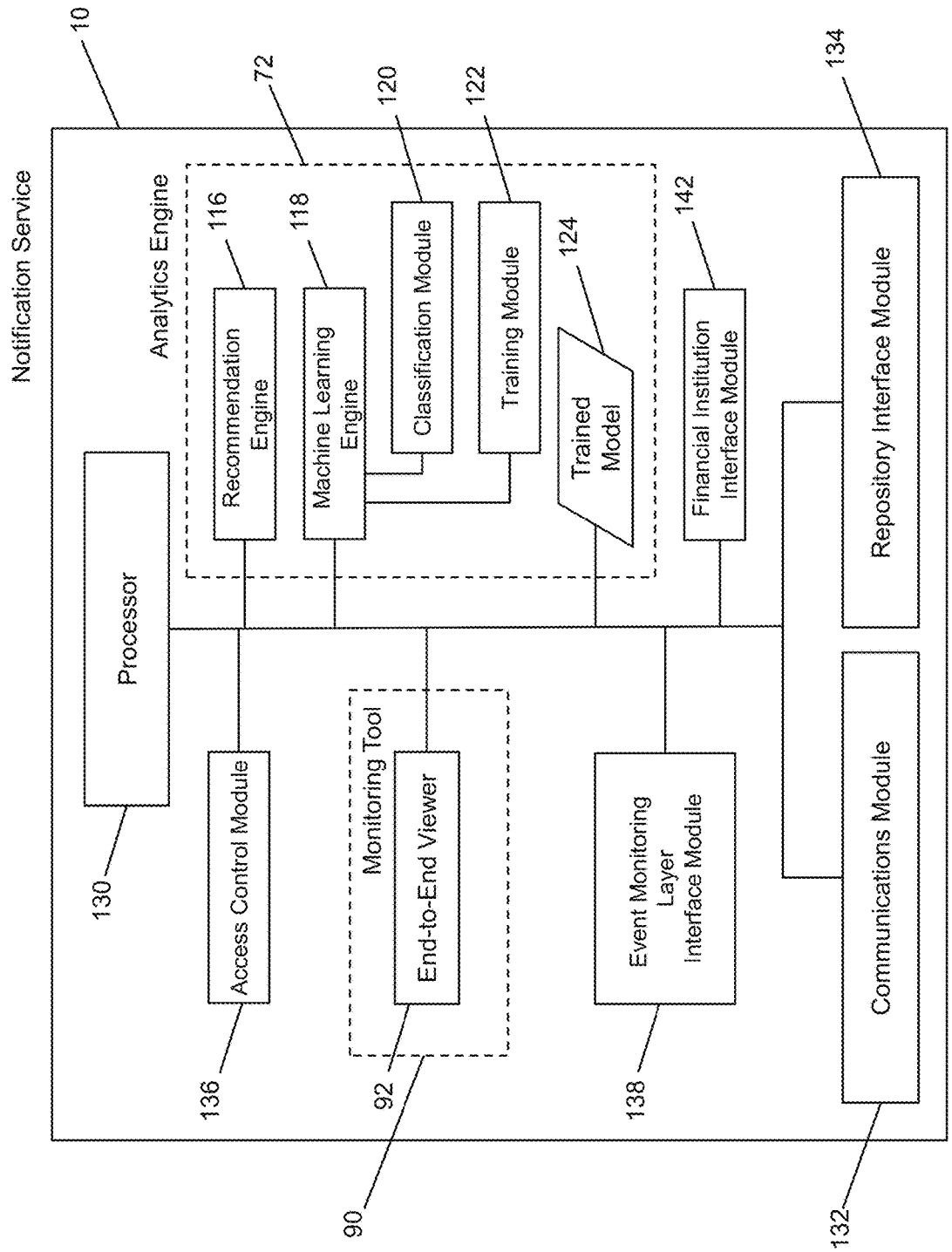
FIG. 7 is a block diagram of an example configuration of the notification service.

In FIG. 7, an example configuration of the notification service 10 is shown. In certain embodiments, the notification service 10 may include one or more processors 130, a communications module 132, and repository interface module 134 for interfacing with the rules, hierarchies, and thresholds data 24 and optionally the event data repository 20 to retrieve, modify, and store (e.g., add) data. Communications module 132 enables the notification service 10 to communicate with one or more other components of the computing environment 8, such as client device 12 (or one of its components), via a bus or other communication network, such as the communication network 14. While not delineated in FIG. 7, the notification service 10 includes at least one memory or memory device that can include a tangible and non-transitory computer-readable medium having stored therein computer programs, sets of instructions, code, or data to be executed by processor 130. FIG. 7 illustrates examples of modules, tools and engines stored in memory on the notification service 10 and operated by the processor 130. It can be appreciated that any of the modules, tools, and engines shown in FIG. 7 may also be hosted externally and be available to the notification service 10, e.g., via the communications module 132. In the example embodiment shown in Fla 7, the notification service 10 can include or otherwise have access to the analytics engine 72, which includes the recommendation engine 116, machine learning engine 118, classification module 120, training module 122, and trained model 124. The notification service 10 can thus also include or have access to the analytics engine 72 to train and utilize a trained model 124 used to detect or recommend actionable items that dictate parameters of a notification. Details of the analytics module 72 are provided above and need not be repeated.

The notification service 10 also includes an access control module 136, an event monitoring layer interface module 138, and a financial institution interface module 142. The notification service 10 can also include the monitoring tool 90 that includes or otherwise provides functionality associated with the end-to-end viewer 92 as described above.

The access control module 136 and financial institution interface module 142 are similar to those used in or by the event monitoring layer 18 as described above and details need not be repeated. The event monitoring layer interface module 138 provides interconnectivity between the notification service 10 and the event monitoring layer 18 as illustrated in FIG. 2, for example, by creating the consumption node 30 shown in FIG.

Figure 8:
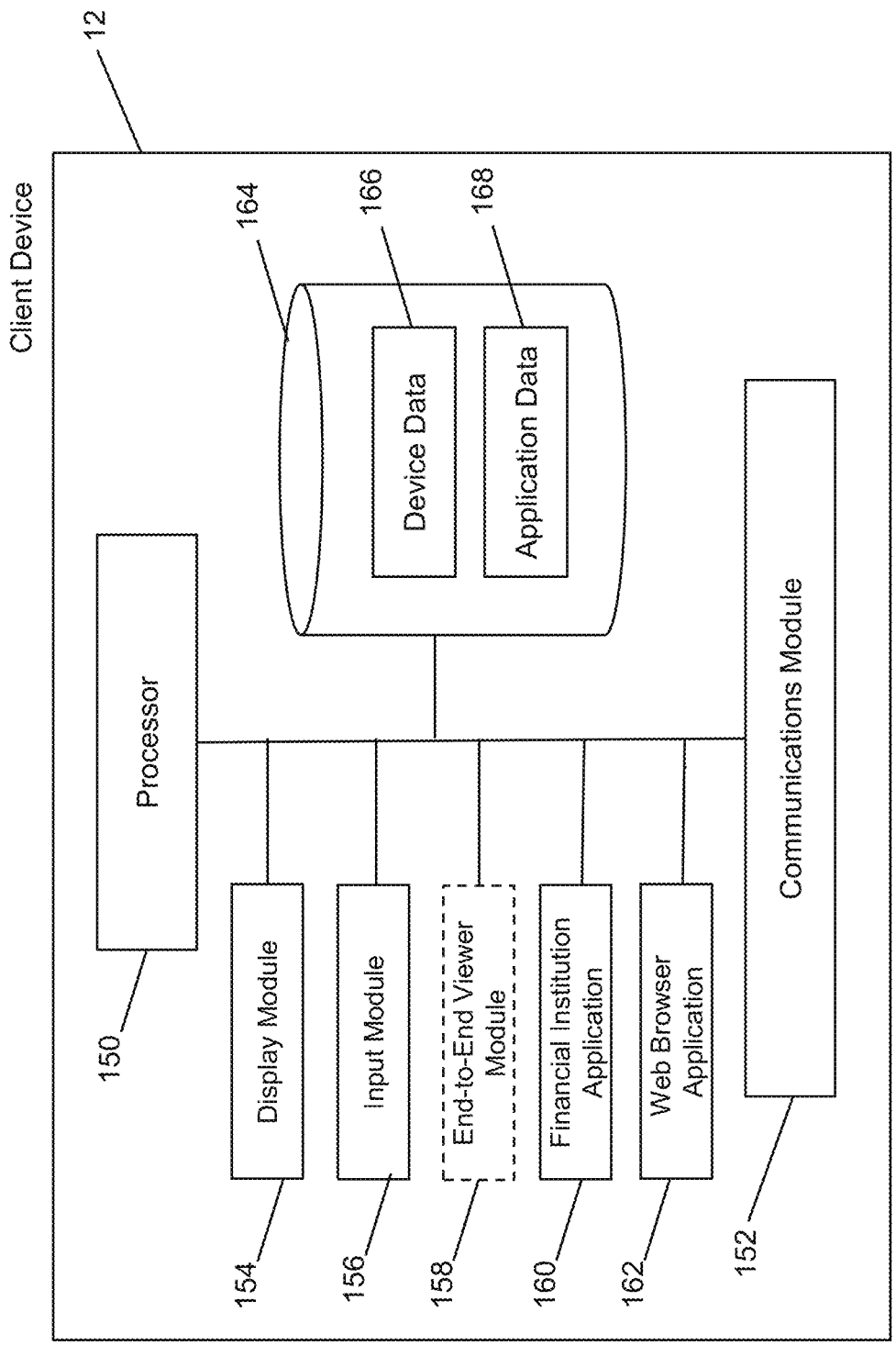
FIG. 8 is a block diagram of an example configuration of a client computing device associated with a user, customer, or client.

In FIG. 8, an example configuration of the client device 12 is shown. In certain embodiments, the client device 12 may include one or more processors 150, a communications module 152, and a data store 164 storing device data 166 and application data 168. Communications module 152 enables the client device 12 to communicate with one or more other components of the computing environment 8, such as notification service 10, event monitoring layer 18, process management system(s) 86, financial institution system 16, via a bus or other communication network, such as the communication network 14. While not delineated in FIG. 8, the client device 12 includes at least one memory or memory device that can include a tangible and non-transitory computer-readable medium having stored therein computer programs, sets of instructions, code, or data to be executed by processor 150. FIG. 8 illustrates examples of modules and applications stored in memory on the client device 12 and operated by the processor 150. R can be appreciated that any of the modules and applications shown in FIG. 8 may also be hosted externally and be available to the client device 12, e.g., via the communications module 152.

In the example embodiment shown in FIG. 8, the client device 12 includes a display module 154 for rendering GUIs and other visual outputs on a display device such as a display screen, and an input module 156 for processing user or other inputs received at the client device 12, e.g., via a touchscreen, input button, transceiver, microphone, keyboard, etc. The client device 12 may also include an end-to-end viewer module 158, which may take the form of a customized app, plug-in, widget, or software component provided by the event monitoring layer 18 or notification service 10 for use by the client device 12 to monitor events. It can be appreciated that the end-to-end view module 158 is shown in dashed lines in FIG. 8 as it may be available only to client devices 12 used by employees 28 and not customers 26. Similarly, the client device 12 may include a financial institution application 160 provided by theft financial institution system 16, e.g., for performing mobile banking operations. The client device 12 in this example embodiment also includes a web browser application 162 for accessing Internet-based content, e.g., via a mobile or traditional website. The data store 164 may be used to store device data 166, such as, but not limited to, an IP address or a MAC address that uniquely identifies client device 12 within environment 8. The data store 164 may also be used to store application data 168, such as, but not limited to, login credentials, user preferences, cryptographic data (e.g., cryptographic keys), etc.

It will be appreciated that only certain modules, applications, tools and engines are shown in FIGS. 2 to 8 for ease of illustration and various other components would be provided and utilized by the notification service 10, event monitoring layer 18, process management system(s) 86, financial institution system 16, and client device(s) 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in notification service 10, or event monitoring layer 18, or process management system(s) 86, or financial institution system 16, or client device(s) 12, or accessible or connectable thereto. Any application or module herein described may be implemented using computer readable/executable instructions that may be stored or otherwise held by such computer readable media.

Figure 9:
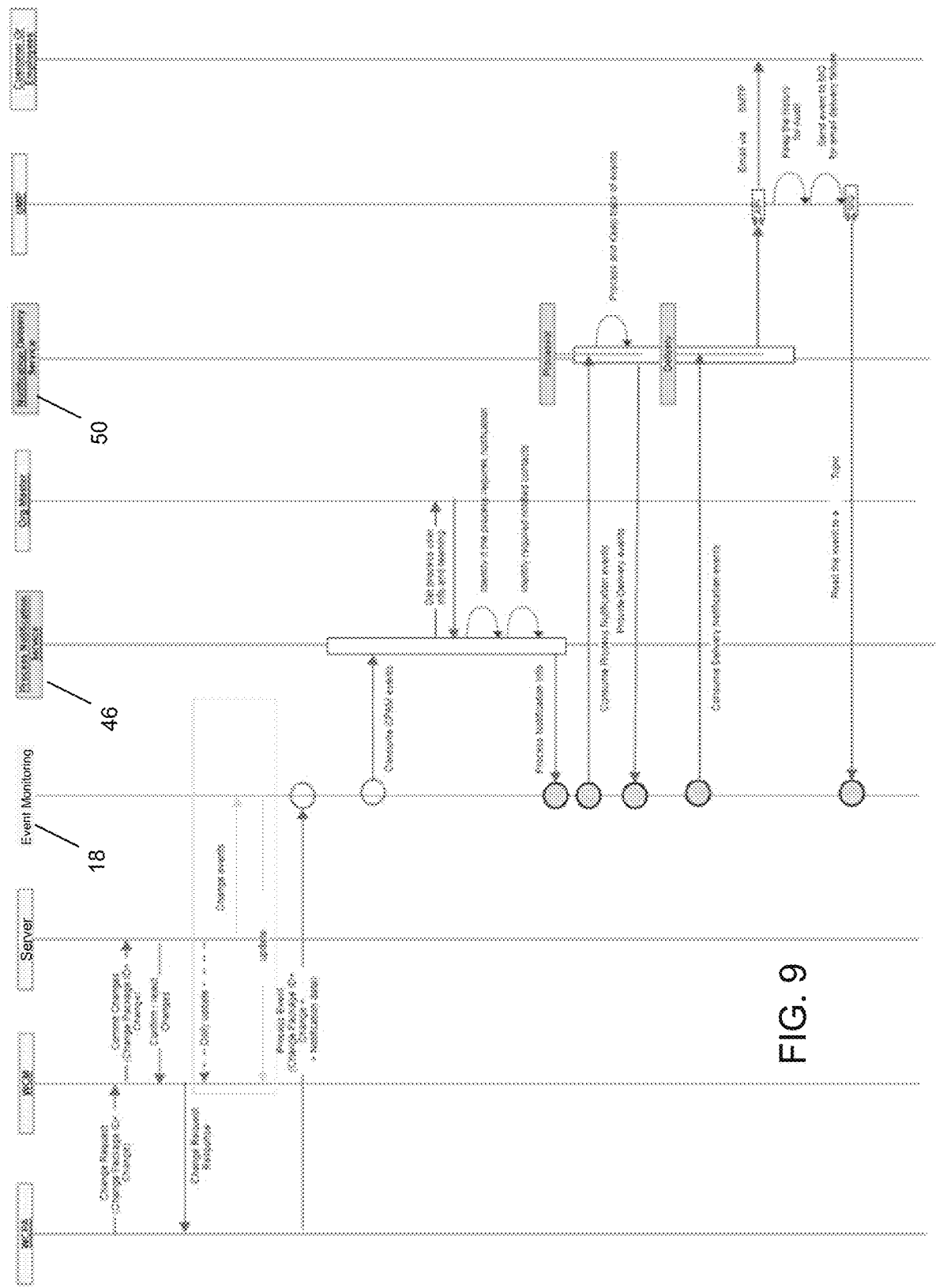
FIG. 9 is a sequence diagram illustrating example data flows in integrating the notification service with the event monitoring layer.

FIG. 9 illustrates an example sequence diagram showing interactions between the event monitoring layer 18 and components of the notification service 10. In FIG. 9, "WCPA", "WCM" and "Server" components are examples of entities within an enterprise such as the financial institution system 16 that create event data 76 consumed by the event monitoring layer 18 and leveraged by the notification service 10. In this example the WCPA sends a change request including a change package ID and the requested change. The WCM commits these changes to the server which returns a confirmation or rejection of the change(s). The change request response is then relayed back to the WCPA. The event monitoring layer 18 receives change events periodically as shown in the sequence diagram. A process event can also be consumed directly by the event monitoring layer 18, which is in turn consumed by the notification processing module 46 (referred to in FIG. 9 as process notification service). The notification processing module 46 performs various operations including getting user information and hierarchical data (denoted as "teaming" in FIG. 9) to identify if the process requires a notification based on the consumed event and to identify the required contacts.

The notification processing module 46 the processes notification information at consumption node 30 in the event monitoring layer 18 to interact with the notification delivery module 50 to process and keep track of events and initiate delivery via the communication channels 54 of the shared platform 52. The notification can also trigger a read operation at the consumption node 30 to enable the event monitoring layer 18 to read the event to a topic in the process. History data can also be stored for auditing purposes and event handling and failures can also be tracked by the notification delivery module 50 or other component of the notification service 10.

Referring now to FIG. 10, an example embodiment of computer executable instructions for monitoring events in process management systems 86 is shown. At block 200, first event data 76 (e.g., event data being produced by one or more process management systems 86) is received by the event monitoring engine 70 from such one or more process management systems 86. It can be appreciated that the first event data 76 can include separate event data 76 from individual process management systems 86 (e.g., 86a, 86b, 86c in FIG. 4), or consolidated event data 76 combined from multiple ones of such process management systems 86. The event monitoring engine 70 stores the first event data 76 in the event data repository 20 at block 202 to enable the first event data 76 to be available to consumers of such data without disrupting the provision of such data 76 by the one or more process management systems 86. At block 204, the event monitoring engine 70 can thus asynchronously provide second event data 76' to such data consumers, such as the monitoring tool 90, analytics engine 72, notification service 10, or other entities, processes or applications (e.g., financial institution application 162).

In FIG. 11, an example embodiment of computer executable instructions for utilizing or consuming the second event data 76' described above is shown, e.g., by the monitoring tool 90. At block 210, the monitoring tool 90 can provide end-to-end views of one or more workflows, e.g., using the end-to-end viewer 92, an example of which are described below making reference to FIG. 13. At block 212, the monitoring tool 90 can also initiate a feedback loop with one or more of the process management systems 86, e.g., to update or advance a process workflow. For example, an employee can visualize a workflow, determine a missing element or another step can be taken to advance a workflow, and send an instruction, alert, notification or other message to assist or automatically progress the workflow. It can be appreciated that workflow data can also be updated at this time. At block 214, notifications can be sent, e.g., to a consumer user 26 or another employee user 28 by providing access to the notification service 10. These notifications can be sent to the client devices 12 associated with the user 26, 28, e.g., via SMS, email, instant messaging, phone, etc. as shown in FIG. 3.

Figure 12:
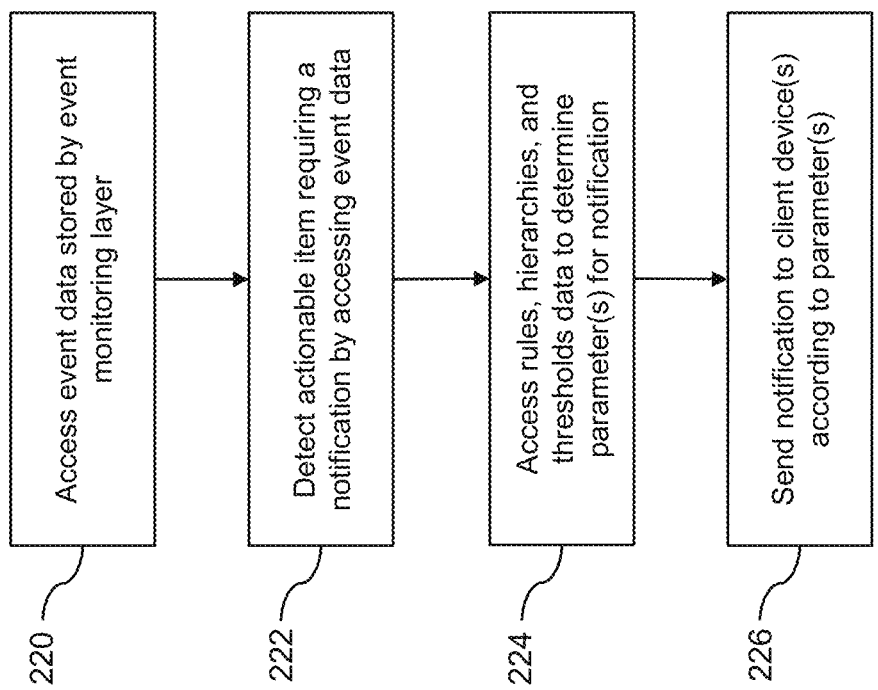
FIG. 12 is a flow diagram of an example of computer executable instructions for executing a notification service.

In FIG. 12, an example embodiment of computer executable instructions for executing the notification service 10 is shown. At block 220 the notification service 10 accesses event data 76 stored by the event monitoring layer 18, e.g., in the event data repository 20. As discussed above, the event monitoring layer 18 can asynchronously obtain and persist such event data 76 and provide snapshots of the event data 76' to allow the notification service 10 to operate as described herein. At block 222, the notification service 10 detects an actionable item requiring a notification by accessing the event data 76 in the event data repository 20. The notification service 10 also accesses the rules, hierarchies, and thresholds data 24 at block 224 to determine one or more parameters for the notification. This can include, for example, to whom, when and with what content to populate the notification. The when can be triggered by a day/time or an event, milestone or combination thereof. The whom can consider hierarchies and other rules to direct the appropriate notification to the appropriate users, e.g., in an escalation. At block 226, the notification service 10 sends the notification to one or more client devices 12 according to the parameters determined in block 224.

Figures 13, 14:
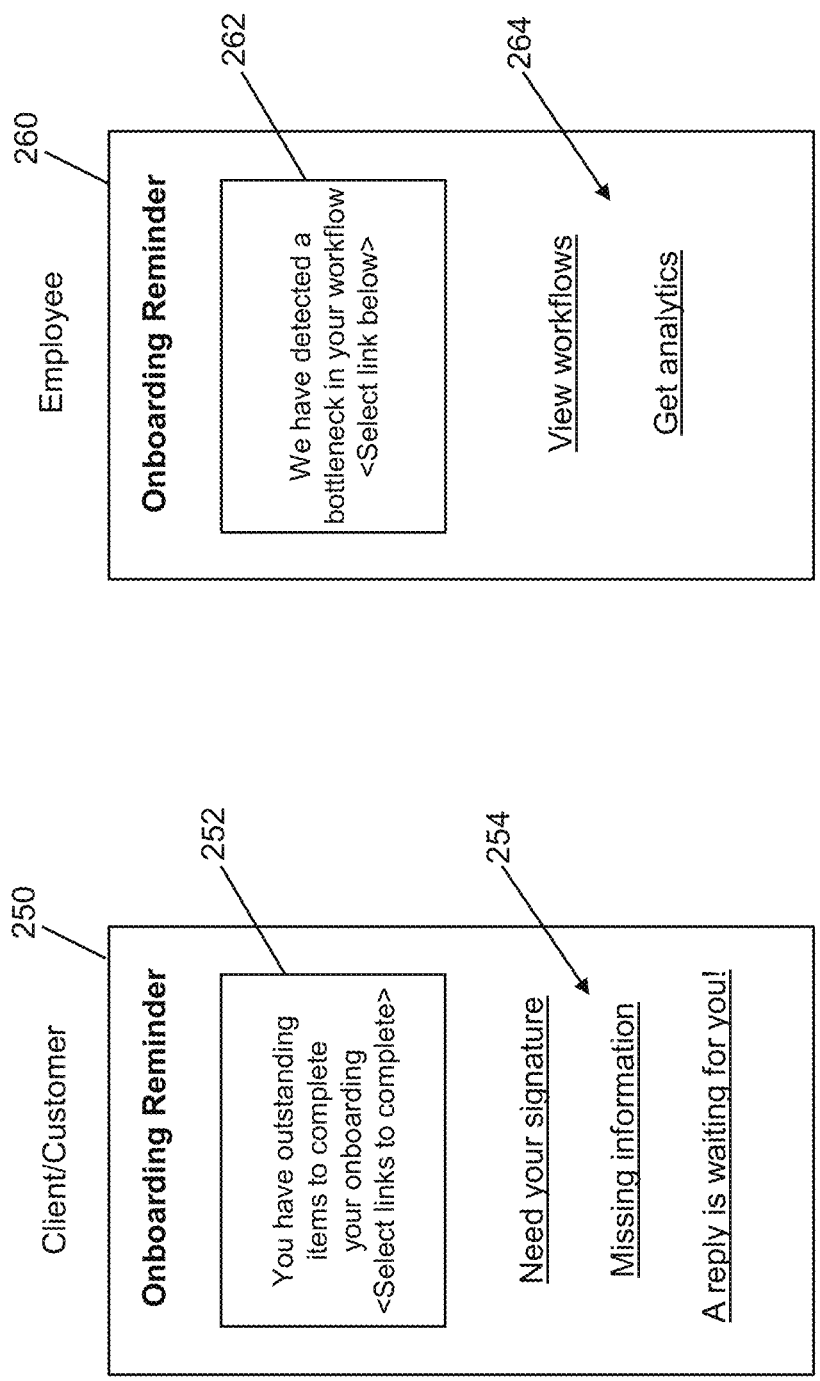
FIG. 13 is an example of a graphical user interface for a client notification.
FIG. 14 is an example of a graphical user interface for an employee notification.

FIGS. 13 and 14 are screen shots 250, 260 of example notification GUIs. In FIG. 13, an onboarding reminder message 252 is presented to a consumer user 26 with a number of links 254 to conveniently enable the user 26 to follow up to complete certain outstanding tasks. In this way, the notification 252 can be used to have workflows more efficiently advanced. In FIG. 14, an employee-related message 262 advises of a bottleneck and provides links 264 to allow for workflows to be visualized (e.g., by linking back to the end-to-end viewer 92) or to obtain more analytics from the analytics engine 72. In this way, the event monitoring layer 18 and notification service 10 can be leveraged to improve the operability of a process management system 86.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A server device for executing notification services, the server device comprising:
    a processor;
    a communications module coupled to the processor; and
    a memory coupled to the processor, the memory storing computer executable instructions that when executed by the processor cause the server device to:
        access persisted event data from a first repository via a notification service, the persisted event data being in the repository that is updated asynchronously by an event monitoring layer consuming events, wherein the notification service tracks persisted event data to track the consumed events separately from the event monitoring layer to detect actionable items, wherein the persisted event data is associated with one or more events, wherein each event is associated with at least one process workflow, and wherein each event is at least in part associated with a sequence in the respective at least one process workflow;
        access a recommendation engine, via the notification service, and infer one or more actionable items from the persisted event data using a trained model, wherein the trained model having has been trained to detect or recommend actionable items by the recommendation engine;
        select, by the notification service, an actionable item identified by the recommendation engine, based on a current progress of a first one of the at least one process workflow being tracked;
        determine, via the notification service, by referencing at least one rule, that the actionable item is to trigger a notification, wherein the actionable item and notification are associated with a subsequent action of the first one of the at least one process workflow that is to be escalated, and wherein new events added to the first repository are reviewed based on a second repository and on a periodic basis to continuously trigger the notification; and automatically send, via the notification service, the notification to at least one client device user to escalate the subsequent action.

2. The server device of claim 1, wherein the actionable item is determined using access to at least one additional repository comprising at least one of rules, hierarchies and thresholds associated with the at least one process workflow.

3. The server device of claim 2, wherein the at least one additional repository is asynchronously updated on an ongoing basis as changes are made within an enterprise employing the notification service, the changes being pushed to the notification service executed by the server device to update the at least one third repository.

4. The server device of claim 1, wherein the actional item is associated with at least one parameter for the notification specifying at least one recipient of the notification.

5. The server device of claim 1, wherein the actional item is associated with at least one parameter for the notification specifying a time when to send the notification.

6. The server device of claim 1, wherein the actional item is associated with at least one parameter for the notification specifying content to be included in the notification.

7. The server device of claim 1, wherein the notification comprises an escalation message to be sent according to a hierarchy in a team of individuals.

8. The server device of claim 1, wherein the computer executable instructions further cause the processor to:
connect with a plurality of communication channels; and
send the notification using a communication channel dictated by the at least one rule.

9. The server device of claim 8, wherein the notification is sent to a plurality of client devices.

10. The server device of claim 9, wherein the notification is sent to the plurality of client devices using at least two different communication channels.

11. A method of executing notification services, the method executed by a server device and comprising:
accessing persisted event data from a first repository via a notification service, the persisted event data being in the repository that is updated asynchronously by an event monitoring layer consuming events, wherein the notification service tracks persisted event data to track the consumed events separately from the event monitoring layer to detect actionable items, wherein the persisted event data is associated with one or more events, wherein each event is associated with at least one process workflow, and wherein each event is at least in part associated with a sequence in the respective at least one process workflow;
accessing a recommendation engine, via the notification service, and infer one or more actionable items from the persisted event data using a trained model, wherein the trained model has been trained to detect or recommend actionable items by the recommendation engine;
selecting, by the notification service, an actionable item identified by the recommendation engine, based on a current progress of a first one of the at least one process workflow being tracked;
determining, via the notification service, by referencing at least one rule, that the actionable item is to trigger a notification, wherein the actionable item and notification are associated with a subsequent action of the first one of the at least one process workflow that is to be escalated, and wherein new events added to the first repository are reviewed based on a second repository and on a periodic basis to continuously trigger the notification; and
automatically sending, via the notification service, the notification to at least one client device user to escalate the subsequent action.

12. The method of claim 11, wherein the actionable item is determined using access to at least one additional repository comprising at least one of rules, hierarchies and thresholds associated with the at least one process workflow.

13. The method of claim 12, wherein the at least one additional repository is asynchronously updated on an ongoing basis as changes are made within an enterprise employing the notification service, the changes being pushed to the notification service executed by the server device to update the at least one third repository.

14. The method of claim 11, wherein the actional item is associated with at least one parameter for the notification specifying at least one recipient of the notification, a time when to send the notification, or both.

15. The method of claim 11, wherein the actional item is associated with at least one parameter for the notification specifying content to be included in the notification.

16. The method of claim 11, wherein the notification comprises an escalation message to be sent according to a hierarchy in a team of individuals.

17. The method of claim 11, further comprising:
connecting with a plurality of communication channels; and
sending the notification using a communication channel dictated by the at least one parameter.

18. A non-transitory computer readable medium for executing notification services, the computer readable medium comprising computer executable instructions for:
accessing persisted event data from a first repository via a notification service, the persisted event data being in the repository that is updated asynchronously by an event monitoring layer consuming events, wherein the notification service tracks persisted event data to track the consumed events separately from the event monitoring layer to detect actionable items, wherein the persisted event data is associated with one or more events, wherein each event is associated with at least one process workflow, and wherein each event is at least in part associated with a sequence in the respective at least one process workflow;
accessing a recommendation engine, via the notification service, and infer one or more actionable items from the persisted event data using a trained model, wherein the trained model has been trained to detect or recommend actionable items by the recommendation engine;
selecting, by the notification service, an actionable item identified by the recommendation engine, based on a current progress of a first one of the at least one process workflow being tracked;
determining, via the notification service, by referencing at least one rule, that the actionable item is to trigger a notification, wherein the actionable item and notification are associated with a subsequent action of the first one of the at least one process workflow that is to be escalated, and wherein new events added to the first repository are reviewed based on a second repository and on a periodic basis to continuously trigger the notification; and
automatically sending, via the notification service, the notification to at least one client device user to escalate the subsequent action.

* * * * *